G. C. GORDON.
COUNTERBALANCED CRANK SHAFT.
APPLICATION FILED JAN. 17, 1917.
1,253,586.
Patented Jan. 15, 1918.
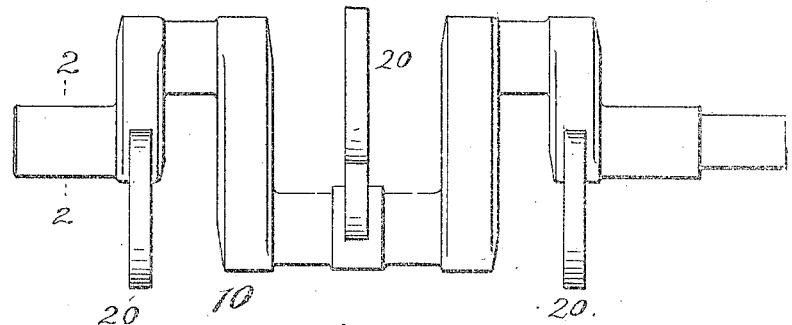
Fig. 1.
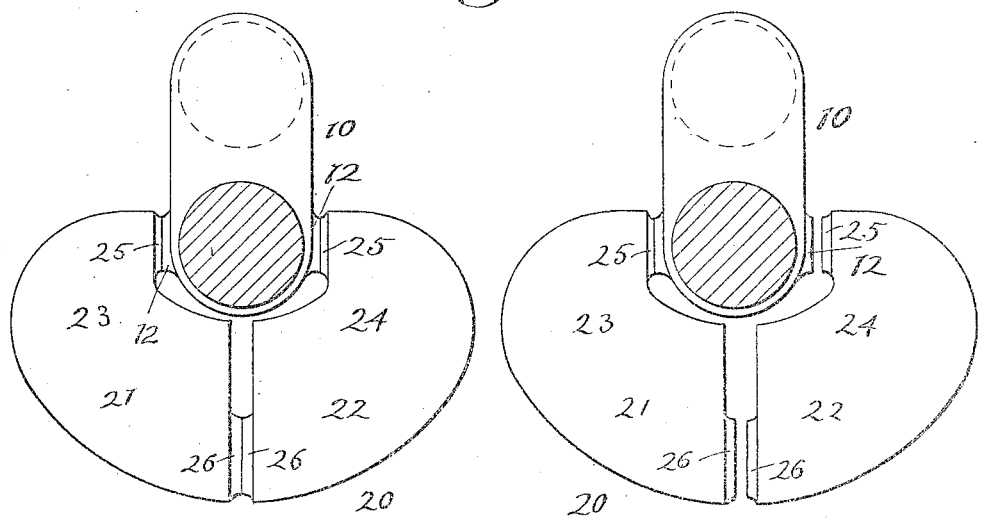
Fig. 3.
Fig. 2.
Inventor
George C. Gordon
By Thurston & Knox
attys

UNITED STATES PATENT OFFICE.

GEORGE C. GORDON, OF CLEVELAND, OHIO, ASSIGNOR TO THE PARK DROP FORGE COMPANY, OF CLEVELAND, OHIO, A CORPORATION OF OHIO.

COUNTERBALANCED CRANK-SHAFT.

1,253,586.  Specification of Letters Patent.  Patented Jan. 15, 1918.

Application filed January 17, 1917.  Serial No. 142,835.

*To all whom it may concern:*

Be it known that I, GEORGE C. GORDON, a citizen of the United States, residing at Cleveland, in the county of Cuyahoga and State of Ohio, have invented a certain new and useful Improvement in Counterbalanced Crank-Shafts, of which the following is a full, clear, and exact description.

The object of this invention is to produce, at a reasonable cost, a counterweighted crank shaft suitable for use in high speed engines, the counterweights of which are accurately placed with respect to the off-center weights they are to counterbalance, and are secured to the crank shaft by means which will preclude the possibility that they will be thrown off the shaft by the centrifugal force generated by any use of such shaft.

The invention consists in the construction and combination of parts shown in the drawings, hereinafter described and pointed out in the appended claims.

In the drawings, Figure 1 is a side elevation of a crank shaft constructed according to the present invention; Fig. 2 is a sectional end view in the plane of line 2—2 on Fig. 1; Fig. 3 is a sectional end view in the same plane, but it shows one-half of the counterweight secured to the crank shaft and the other half of said counterweight in the position it will occupy just before being so secured to the crank shaft.

The crank shaft 10 may be of any suitable construction determined upon by the designer having in mind the number of cylinders of the engine with which the crank shaft is to be used, the number of bearings which it is thought desirable that the crank shaft shall have, and other engineering factors which are well understood.

I have chosen to exemplify the invention in connection with a two-bearing four-throw crank shaft 10 of conventional form. It is customary to secure a number of separately formed counterweights to a crank shaft, and to so connect the counterweights to the crank shaft that each will be, as near as possible, in diametrical opposition to the offcenter weight of the crank shaft which the counterweight is intended to counterbalance; and I do not recommend any change in this conventional practice.

The present invention relates particularly to the counterweights and to the means for securing them to the crank shaft and in proper relation thereto,—the primary object being to do this inexpensively and accurately and in such manner as to insure that the centrifugal force generated at high speeds will not break the connections between the counterweight and shaft.

To that end each counterweight 20 is formed of two pieces 21, 22, which are preferably counterparts of each other, and which are connected together in the manner shown as will be presently explained.

When the two parts are so connected the resulting counterweight has two leg branches 23 and 24; and each of these leg branches is formed with a lug 25 projecting therefrom at right angles and toward the other leg branch. The adjacent edges of the two counterpart halves of the counterweight are respectively formed with lugs 26 which extend toward one another and have their opposed and contacting faces formed parallel with each other. When the described counterweight is completed the opposed and engaging faces of these two lugs are welded together; likewise the lugs 25 have their ends welded to the ends of the lugs 12 on the crank shaft provided for that purpose. The three welded together joints will, therefore, lie in planes which are parallel with the direction in which centrifugal force will exert its force upon the counterweight tending to tear it loose from the crank shaft; and this disposition and arrangement of a welded joint is better able to resist such centrifugal force than a joint located in any other position relative to the direction of that centrifugal pull.

The making of the counterweights of two halves, each formed with the lugs 25, 26, greatly facilitates the welding together in an electric welding machine of the ends of the opposed lugs 26, and 12 and 25; in fact, the lugs 12 on the countershaft and the lugs 26 on the counterweight could not be practically welded together electrically except for the fact that the counterweight is made in two parts. In welding the counterweight to the shaft, one part of the counterweight is first electrically welded on, that is to say, the lug 25 thereon has its end welded to the end of the lug 12. In effecting the welding together of these two lugs it is possible to move the counterweight toward and from the shaft and cause the repeated engagement and disengagement of the ends of these lugs in order to promote the heating of these ends to the welding temperature.

Then when one half has been so secured the other half is welded on, and the lugs 26 on the two halves are welded together simultaneously with the welding together of the ends of the lugs 25 and 12. It is possible to move the counterweight so as to repeatedly cause the engagement and disengagement of the two pairs of lugs while they are being raised to the welding temperature.

Having described my invention, I claim:—

1. The combination of a crank shaft having two oppositely extended lugs, and a counterweight having two leg branches which straddle the part of the crank shaft whereon said lugs are formed,—each of said leg branches having a lug which extends toward the other,—the ends of the two lugs on the leg branches of the counterweight being electrically welded to the ends of the two lugs on the crank shaft.

2. The combination of a crank shaft having two oppositely extended lugs, and a counterweight formed of two halves placed side by side,—the adjacent edges of each being formed with a projecting lug which engages with and is electrically welded to the end of the associated lug on the other half,—and said two halves having respectively two leg branches which lie on opposite sides of the crank shaft and each has a lug which projects toward the other, the ends of said lugs being respectively electrically welded to the ends of the lugs formed on the crank shaft.

In testimony whereof, I hereunto affix my signature in the presence of two witnesses.

GEORGE C. GORDON.

Witnesses:
O. L. ELLIS,
J. A. CALL.